Sept. 4, 1956 R. L. STEINER Re. 24,208

TOY WATER PISTOL WITH DIRECTION INDICIA

Original Filed Jan. 24, 1956

INVENTOR.
Robert L. Steiner.
BY
Wood, Herron & Evans.
ATTORNEYS.

United States Patent Office

Re. 24,208
Reissued Sept. 4, 1956

24,208

TOY WATER PISTOL WITH DIRECTION INDICIA

Robert L. Steiner, Cincinnati, Ohio, assignor to Bromo-Mint Company, Inc., Cincinnati, Ohio, a corporation of Ohio Original No. 2,746,644, dated May 22, 1956, Serial No. 561,032, January 24, 1956. Application for reissue May 24, 1956, Serial No. 587,186

10 Claims. (Cl. 222—47)

Matter enclosed in heavy brackets [ ] appears in the original patent but forms no part of this reissue specification; matter printed in italics indicates the additions made by reissue.

This invention relates to water pistols and it is directed in particular to a toy water pistol which has a device in the discharge end of the pistol barrel by means of which the direction of the stream of water issuing from the pistol may be changed relative to the direction in which the pistol is pointed.

One of the objects of the invention is to provide a toy pistol of the type set forth in which the device which alters the direction of the stream of water is built into the pistol so that it is difficult for an observer to anticipate the direction which the stream of water will take, the direction of the stream coming as a surprise to the observer. *In addition, a signaling device is provided by means of which the user of the water pistol may determine the direction which the stream of water will take.*

Another objective of the invention is to provide a toy pistol incorporating a device of the type set forth which is inexpensive to manufacture and yet which is sufficiently rugged to withstand the hard knocks and abuse which toys of this type are subjected to in the course of play by children.

A further objective of the invention is to provide a water pistol of the type set forth which is easily adjusted and which is not likely to develop leaks even though it is subjected to hard use over a prolonged period.

A further objective of the invention is to provide a device for changing the direction of the stream of water, as set forth above, which is adapted to be incorporated in a water pistol of the type in which the interior of the water pistol is hollow to constitute a reservoir, whereby a substantial supply of water may be carried in the pistol.

Another objective of the invention is to provide a water pistol of the type set forth which is adapted to be made of molded plastic such that it is inexpensive to manufacture and comparatively simple to assemble.

Other objectives of the invention will be readily apparent to those skilled in the art from the following detailed description of the drawings in which.

The water pistol of the invention is designated generally by the numeral 10. The body of the water pistol including the handle or butt, the breech, and barrel comprises two, right and left shell-like halves which are molded of plastic and which are joined together along lines which lie in a plane extending through the longitudinal axis of the pistol. It is preferred that the two halves be secured together at an overlapping joint designated 11, which joint may be sealed by water proof adhesive or by plastic solvent so as to be leak proof. A trigger guard 12 for the pistol may be made, following conventional practice, as part of one, or the other, or both of the two half shells comprising the body of the pistol. In addition, a resilient filler plug such as the one shown at 13 may be provided to close the opening through which the water is poured into the hollow interior of the body of the pistol.

*It will be appreciated by those skilled in the art that the invention is applicable to a toy water pistol in which a different type of water reservoir is provided, for example, one at the outside of the body of the pistol, so long as some means are provided to convey the water under pressure to the device at the discharge end of the pistol barrel by means of which the direction of the stream of water issuing from the pistol may be changed.*

Figure 1:
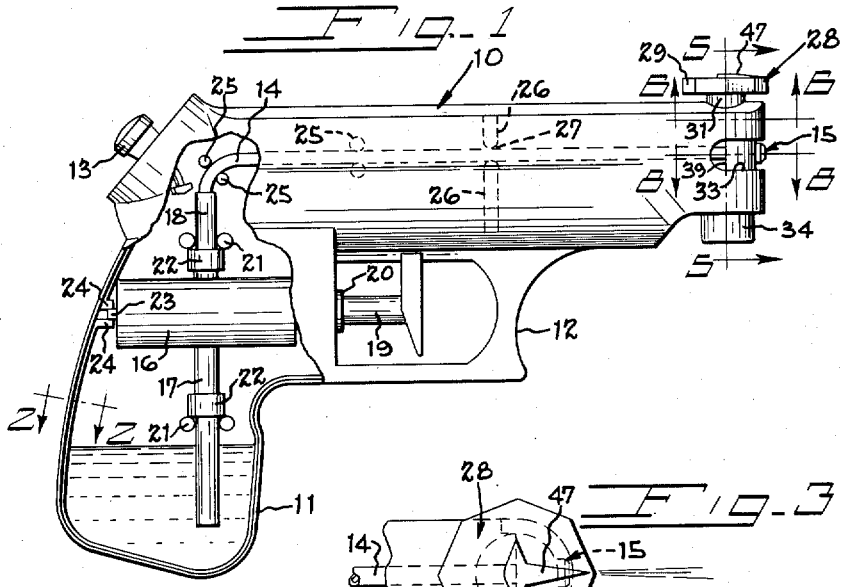
Figure 1 is a side elevational view of a water pistol incorporating the principles of the present invention in which a portion of the handle is broken away to illustrate details of construction.
Figure 3:
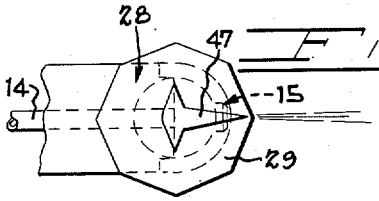
Figure 3 is a fragmentary top plan view of the discharge end of the barrel of the water pistol only, showing the pistol adjusted for discharging a stream of water straight ahead in alignment with the longitudinal axis of the barrel.
Figure 2:
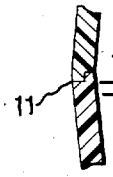
Figure 2 is a fragmentary cross sectional view taken on the line 2—2 of Figure 1.

In general, any type of [trigger operated] *suitable* pump may be used to force water from the inside of the pistol body and, in the present instance, through a small [rubber] *flexible* hose 14, *which may be made of rubber, plastic or similar material,* to a jet exhaust nozzle 15. The pump illustrated, following known constructions, employs a trigger operated piston (not shown) which is located inside of the pump cylinder 16, an inlet tube 17 which extends from the underside of cylinder 16 down into the lower part of the hollow handle of the pistol, a discharge tube 18 which connects the pump cylinder to the hose 14, and a plunger or piston rod 19 which is slidably mounted in a bushing 20 at the forward end of the pump cylinder and which is connected to the trigger. The inlet tube 17 and the outlet tube 18, following pump devices which are disclosed in the prior art, include one-way check valves which are arranged so that when the trigger operated plunger *rod* 19 is forced into cylinder 16, water is ejected from the cylinder through tube 18 and hose 14 to the nozzle. The check valves are also arranged so that when the plunger *rod* is forced by means of a spring (not shown) into the extended position shown in Figure 1, the check valve in outlet tube 18 closes and the check valve in tube 17 opens so as to permit water to be pulled up through tube 17 to fill the pump cylinder. It is preferred that the pump, the two inlet and outlet tubes, and the plunger-trigger unit be assembled prior to the assembly of the pistol so that they may be installed as a unit and held in place by means such as the projections 21—21 which extend inwardly from the respective half shells to engage the sides of the two tubes 17 and 18. Preferably, collars such as those designated 22—22 are provided on the two tubes which contact the projections as shown to hold the unit in place. In addition, the rear end of cylinder 16 may have a lug 23 formed thereon which may be engaged between projections 24—24 formed as integral parts of the pistol body to further lock the pump assembly in place inside of the pistol.

The hose 14 may also be held in place by projections 25—25 which are similar to the projections 21—21. The hose 14 is also held in place by means of a wall 26 which extends tranversely across the inside of the barrel portion of the pistol. This wall may be formed as an integral part of either one or both of the half shells which constitute the body of the pistol and it has a hole 27 in it through which the hose 14 extends. The wall 26 constitutes the front end for the reservoir inside of the pistol, and so as to prevent water leaking through the hole in the wall around hose 14, it is preferred that the fit between the hose and the wall be a comparatively tight one and/or that adhesive be employed to seal the opening through which the hose passes.

The means for changing the direction of the stream of water issuing from the nozzle 15 is shown generally at 28. This means, designated a "direction changer" or "plug" may be made of plastic, preferably a semi-resilient plastic such as polyethylene. The direction changer is mounted at the discharge end of the barrel of the pistol for limited rotation about a vertical axis, and it comprises a control knob 29, which is at its upper end and which is exposed above the pistol barrel, a substantially enlarged central cylinder portion 30 enclosed within the pistol barrel, a stub shaft portion 31 which joins the knob 29 and the central cylinder portion 30, and a stub shaft portion 32 which extends from the lower end of the central portion 30. The two stub shaft portions 31 and 32 of the plug may be substantially the same diameter, whereas the central cylindrical portion 30 preferably is substantially larger in diameter.

Figure 6:
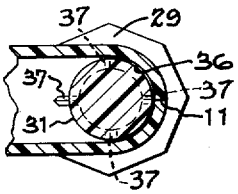
Figure 6 is a fragmentary cross sectional view taken on the line 6—6 of Figure 1.
Figure 7:
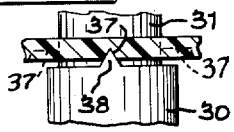
Figure 7 is a fragmentary cross sectional view taken on the line 7—7 of Figure 5.

The front end of the barrel of the pistol preferably is rounded as shown in Figure 6 on an axis which is concentric to the vertical central axis of the direction control device. In addition, the rounded front end of the pistol barrel is slotted as at 33 from one side, around the front of the barrel, and to the other side, with the respective ends of the slots being rounded on centers which are on a line extending transversely through the vertical central axis of rotation of the directional control device. The front of the pistol also has a cup 34 formed at its underside, which cup provides a means for journalling the lower end of stub shaft 32. The cup is substantially deeper than the extent of the stub shaft 32, and, in the present instance, a small pad 35 of rubber is seated in the lower part of the cup to provide: one, friction to resist the turning of the direction control device and, two, to provide a spring device for urging the direction control device upwardly. The upper stub shaft 31 extends through and is journalled by a circular aperture 36 in the top of the pistol barrel. Immediately under, and surrounding this aperture, the upper wall of the barrel has four V-shaped notches 37 formed in it, which notches are aligned in pairs respectively with the longitudinal and transverse axes of the pistol barrel. These cooperate with V-shaped detent lugs 38 which are located on the shoulder provided atop the enlarged, central, cylindrical portion 30 of the direction control device surrounding stub shaft 31. The detent lugs 38 are at the respective sides of the direction control device when it is arranged for directing the stream of water issuing from the pistol straight ahead. The tendency for the rubber to push the direction control device upwardly holds the detent lugs in whichever one of the two sets of V-shaped notches 37 they are engaged. The friction afforded by the rubber pad also tends to hold the directional control device in positions intermediate the respective sets of notches. It will be seen, therefore, that the directional control device may be turned through 180 degrees from one side to the other within the limits provided by the extent of slot 33.

Figure 8:
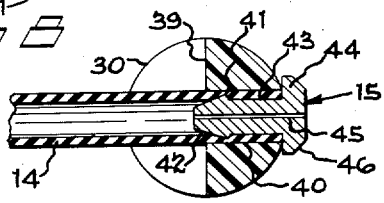
Figure 8 is a fragmentary cross sectional view taken on the line 8—8 of Figure 1.

The rear half of the central portion of the direction control device is relieved or cut out as shown at 39. The direction control device has a bore 40 extending through it from front to back in the cut out area and the hose 14 is engaged in this bore. The hose may be secured in bore 40 by adhesive although the wedging action of the nozzle 15 which preferably is engaged in the hose as shown in Figure 8 is found to be sufficient. The wedging action is provided by a shoulder 41 formed where a conical inner end 42 of the nozzle meets a shank 43 which is smaller in diameter than the diameter of the largest part of the conical portion. The outer end of the nozzle is flanged as at 44 and the nozzle has a small restricted bore 45 through it to form a jet stream of water pumped from the pistol. The outer flanged end of the nozzle may be bevelled as at 46 if desired. Hose 14 preferably fits all of the way through the bore 40 so that the flange 44 rests against its outer end.

Figure 4:
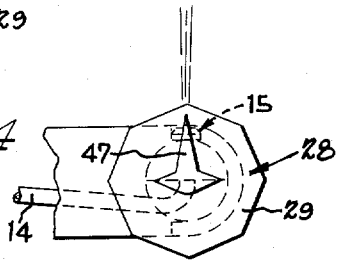
Figure 4 is a view similar to Figure 3 showing the end thereof adjusted to direct a stream of water at 90 degrees to the left of the longitudinal axis of the barrel.
Figure 5:
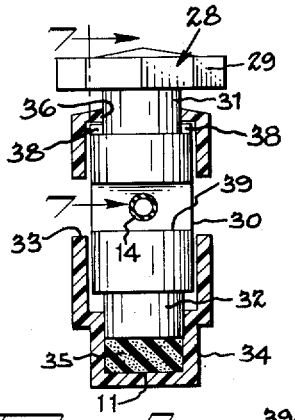
Figure 5 is an enlarged fragmentary cross sectional view through the discharge end of the barrel of the pistol taken on the line 5—5 of Figure 1.

The cut out portion in the rear half of the central part of the direction control device provides clearance for the hose when the direction control device is turned from side to side. See Figure 4. By connecting the jet exhaust nozzle 15 by hose directly to the pump there is no chance for water to leak from the water ejecting system. The direction in which the control nozzle is set may be indicated on the top of the knob 29 by an embossed pointer such as the one shown at 47. *This pointer constitutes a signaling means by which the user of the water pistol may determine the directional setting of the rotatable plug element. As shown in the drawings, it is preferred that the signaling means be small enough so that it cannot be seen readily by the casual observer. It will be apparent that other types of signaling means may be employed which operate in an equivalent manner.*

It will be seen, therefore, that the toy water pistol may be selectively adjusted by means of knob 29 to direct a stream of water at 90 degrees from either side of the barrel, or in any intermediate direction, including straight ahead. The small discharge nozzle, being within slot 33, is difficult for the casual observer to see so that the direction which the stream takes comes as a surprise to the observer.

Having described my invention I claim:

1. In a toy water pistol having a hollow interior to constitute a reservoir and having a trigger operated pump therein, a flexible hose having one end thereof connected to said trigger operated pump and extending forwardly therefrom through the barrel of said pistol, an apertured wall extending transversely of said barrel interior to constitute a wall of said reservoir, said hose extending through said apertured wall, an element mounted within the barrel of the pistol at the discharge end thereof for turning movement about a vertical axis, a discharge nozzle mounted in a side of said element, said hose being fastened to said element and being in communication with said discharge nozzle, whereby water forced by said trigger operated pump through said hose is discharged from said nozzle, the end of the barrel being open through at least 180 degrees from one side, around the front and to the other side thereof, the rear half of said element being relieved at the rear side thereof and in the area thereof adjacent to the connection of the hose to said element, and a knob at the discharge end of the water pistol adapted for selectively adjusting said element for directing the nozzle and thence the direction at which the stream of water is discharged from said nozzle, the relieved portion of the rotatable element permitting the flexible hose to follow the turning movement of said element without kinking.

2. In a toy water pistol having a trigger operated pump therein, a flexible hose connected at one end to said trigger operated pump and extending forwardly through the barrel of said pistol, a plug mounted in the pistol barrel at the discharge end thereof for turning movement from side to side about a vertical axis, a knob formed as an integral part of said plug and being disposed at the top of said barrel for selectively changing the position of said plug, a discharge nozzle mounted in said plug, the forward end of said hose being secured to said plug in communication with said discharge nozzle, and the front of said barrel being open through at least 180 degrees from one side to the other side thereof, whereby the plug may be selectively turned through said 180 degrees to discharge a stream of water at right angles to one side or the other side of said barrel and from any position intermediate the two right angular positions.

3. A toy water pistol having a hollow interior to constitute a reservoir and having a trigger operated pump therein, an element mounted within the barrel of the pistol at the discharge end thereof for turning movement about a vertical axis, a flexible hose having one end thereof connected to said trigger operated pump and extending forwardly therefrom through the barrel of said pistol, the opposite end of said flexible hose being fastened to said element for turning movement therewith whereby water forced through said hose by the trigger operated pump is discharged from the pistol in a direction dependent upon the position of said element, and said element being relieved at the rear side thereof and in the area thereof adjacent to the connection of the hose to said element, the relieved portion of the element permitting the flexible hose to follow the turning movement of said element without kinking.

4. In a water pistol of the type having a hollow interior with a trigger operated pump therein, means to selectively change the direction at which water issues from the pistol comprising an element rotatably mounted in the end of the barrel of the pistol for turning movement about a vertical axis, a flexible hose having one end thereof extending horizontally through the vertical axis of the element and being secured to said element, the opposite end of said hose connected to said pump whereby actuation of the pump discharges water from the first mentioned end of the hose, and the rearward part of the element being relieved at the area thereof adjacent to the hose whereby said element may be turned about its vertical axis from side to side to direct water issuing from the hose from side to side without causing the hose to kink at the rear side of the element.

5. A toy water pistol having a hollow interior to constitute a reservoir and having a trigger operated pump therein, an element mounted within the barrel of the pistol at the discharge end thereof for turning movement about a vertical axis, a flexible hose having one end thereof connected to said trigger operated pump and extending forwardly therefrom through the barrel of said pistol, and the forward portion of said flexible hose being free of the barrel and fastened to said element for turning movement therewith, whereby water forced through said hose by the trigger operated pump is discharged from the pistol in a direction dependent upon the position of said element.

6. In a toy water pistol having a trigger operated pump and a discharge nozzle, means mounting said nozzle at the discharge end of the barrel of the pistol, said means being mounted for turning movement from side to side, a flexible hose connecting said pump to said discharge nozzle, and detent means for said means mounting said nozzle, said detent means defining definite positions for said turning movement which directs the nozzle at right angles to the longitudinal axis of the barrel in two positions and parallel to the said axis in a third position.

*7. In a toy water pistol having a barrel and a pump for ejecting water from the barrel, a device for controlling the direction of water ejection, said device being associated with the barrel of the pistol adjacent to the discharge end thereof and comprising an element mounted for turning movement about a vertical axis and a flexible hose, said hose having its forward end connected to said element and being turnable therewith, and means for supplying water from said pump to the rearward end of the hose.*

*8. In combination with a toy water pistol having a barrel and a pump for ejecting water from the barrel, a device for controlling the direction of water ejection, said device being connected with the pistol barrel adjacent the discharge end thereof and including an element mounted for selective turning movement about a vertical axis, and a flexible hose, said hose having its forward end connected to said element and being turnable therewith and having its rearward end in fluid connection with the pump, whereby actuation of the pump discharges water from the pistol in a direction dependent upon the position of the element relative to the barrel of the pistol.*

*9. In a toy water pistol having a hollow interior constituting a reservoir and a pump interconnected to said reservoir, a device for selectively controlling the direction of water ejection from the barrel without disclosing the selected direction to a person positioned a short distance away, said device comprising an element mounted adjacent the discharge end of the barrel for turning movement about a vertical axis, a flexible hose having its forward end connected to said element and turnable therewith, means for supplying water from said pump to the rearward end of said hose, and signal means associated with the turning element for indicating to the pistol user his selected direction of water ejection.*

*10. In a toy water pistol having a hollow interior constituting a reservoir and a pump interconnected to said reservoir, a device for selectively controlling the direction of water ejection from the barrel without disclosing the selected direction to a person positioned a short distance away, said device comprising an element mounted at the discharge end of the barrel for turning movement about a vertical axis, the forward end of said flexible hose being disposed closely adjacent the discharge end of the barrel and being connected to said element and turnable therewith, and the rearward end of said hose being in fluid connection with the reservoir, said turning element having a control portion thereof extending beyond the surface of the barrel, said control portion having indicia thereon for indicating to the pistol user his selected direction of water ejection.*

References Cited in the file of this patent or the original patent

UNITED STATES PATENTS

| | | |
|---|---|---|
| 958,711 | De Moulin | May 17, 1910 |
| 958,712 | Riggs | May 17, 1910 |
| 2,698,700 | Grosh | Jan. 4, 1955 |